United States Patent [19]

Harris

[11] Patent Number: 4,959,499

[45] Date of Patent: Sep. 25, 1990

[54] LIQUID POLYMERS CONTAINING URETHANE AND UREA MOIETIES AND HYDROXYL AND/OR AMINO END GROUPS AND A PROCESS FOR THE PREPARATION THEREOF

[75] Inventor: Robert F. Harris, Midland, Mich.

[73] Assignee: The Dow Chemical Company, Midland, Mich.

[21] Appl. No.: 227

[22] Filed: Jan. 2, 1987

Related U.S. Application Data

[63] Continuation-in-part of Ser. No. 926,692, Nov. 4, 1986.

[51] Int. Cl.$^5$ ................... C08G 71/00; C08G 71/02; C08G 71/04

[52] U.S. Cl. ....................... 564/59; 564/61; 528/196

[58] Field of Search ............... 564/59, 61; 528/196

[56] References Cited

U.S. PATENT DOCUMENTS

| | | |
|---|---|---|
| 2,550,767 | 5/1951 | Buckley et al. ............ 564/59 X |
| 3,133,113 | 0/1964 | Malkemus . |
| 3,248,414 | 4/1966 | Stevens . |
| 3,277,061 | 10/1966 | Fenton ................. 564/61 X |
| 3,324,070 | 5/1967 | Hostettler et al. . |
| 3,379,693 | 4/1968 | Hostettler et al. . |
| 3,567,763 | 3/1971 | Emmons . |
| 3,689,462 | 9/1972 | Maximovich . |
| 4,002,598 | 11/1977 | Waddill et al. . |
| 4,105,641 | 8/1978 | Buysch et al. . |
| 4,108,842 | 8/1978 | Konig et al. . |
| 4,115,360 | 9/1978 | Schulze et al. . |
| 4,116,938 | 9/1978 | Schulze et al. . |
| 4,178,427 | 12/1979 | Waddill et al. . |
| 4,191,705 | 3/1980 | Lindner et al. . |
| 4,267,120 | 5/1981 | Cuscurida et al. . |
| 4,356,275 | 10/1982 | Wagner et al. . |
| 4,394,491 | 7/1983 | Hoffman . |
| 4,435,527 | 3/1984 | Cuscurida . |
| 4,476,293 | 9/1984 | Robinson . |
| 4,484,994 | 10/1984 | Jacobs et al. . |

FOREIGN PATENT DOCUMENTS 890340 9/1953 Fed. Rep. of Germany ........ 564/61

OTHER PUBLICATIONS

Siefken, J. Liebigs Ann. Chem., 562, pp. 75–136.
Cameresi, Ann. Chim (Rome) 51, 927 (1967).
Polymer Letters Edition, vol. 12, pp. 517–521 (1974).
Giori, Chemistry Div. Polymer Res. IIT Res. Inst.
Iguchi, Journal of Polymer Science, vol. 13, 785–795 (1975).
Loch et al, Chemical Abstracts, vol. 102, #47426h (1985).

Primary Examiner—Floyd D. Higel

[57] ABSTRACT

Novel polyahls having backbones containing urea, urethane and polyamine moieties and hydroxyl and/or amine terminal groups are prepared by contacting a polyamine such as an aminated polyether polyol or hexamethylene diamine with a cyclic alkylene carbonate such as propylene carbonate under conditions sufficient to form the polyahl and a monoalkylene glycol. The monoalkylene glycol is removed from the reaction mixture in order to drive the reaction to completion.

Such polyahls are useful in the preparation of isocyanate-functional prepolymers and polyurea/polyurethanes. The latter are suitably employed as flexible and rigid foams, coatings, RIM elastomers and other applications where conventional polyurethanes are employed.

7 Claims, No Drawings

LIQUID POLYMERS CONTAINING URETHANE AND UREA MOIETIES AND HYDROXYL AND/OR AMINO END GROUPS AND A PROCESS FOR THE PREPARATION THEREOF

CROSS-REFERENCE TO RELATED APPLICATIONS

This application is a continuation-in-part of copending U.S. application Ser. No. 926,692, filed Nov. 4, 1986, by the same inventor; and is related to copending U.S. application Ser. No. 831,761, filed Feb. 12, 1986, now U.S. Pat. No. 4,689,353.

FIELD OF THE INVENTION

This invention relates to polyurea polyahls and to methods for their preparation.

BACKGROUND OF THE INVENTION

Polyamines are known to react with alkylene carbonates to form 2-hydroxyalkyl urethanes. This reaction occurs by merely heating the two reactants at 100° C. (U.S. Pat. Nos. 4,122,068: 4,122,069 and 4,484,994).

Products containing amino terminal groups and polyether and urea moieties in their backbone have long been known. One method for preparing amino-terminal polyethers having urea groups involves the following reactions of urea with diamines $$NH_2-R-NH_2 + NH_2\overset{O}{\underset{\|}{C}}NH_2 \longrightarrow$$

$$NH_2-R-NH\underset{\|}{(}\overset{O}{C}NH-R-NH)_{\overline{n}}H + NH_3\uparrow$$

(U.S. Pat. Nos. 4,002,598; 4,115,360: 4,116,938; 4,178,427 and DE 2,748,705). Such materials have been used in combination with aldehydes as epoxy curing agents.

By slightly changing the stoichiometry of the reactants, polymers have been made containing urea end groups and polyether and urea groups in their backbone such as $$NH_2-R-NH_2 + NH_2\overset{O}{\underset{\|}{C}}NH_2 \longrightarrow$$

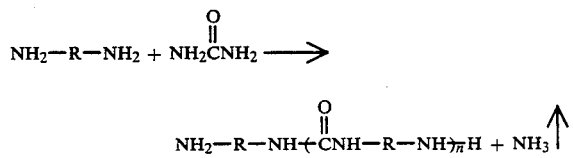

(U.S. Pat. Nos. 4,141,855 and 4,356,275). Such polymers have been used in combination with aldehydes as epoxy curing agents.

A second known method of producing amino-terminal polyethers containing urea moieties in their backbone involves the reaction of polyether polyamines with diphenyl carbonate with the removal of phenol as follows:

$$NH_2-R-NH_2 + \phi OCO\phi \longrightarrow$$

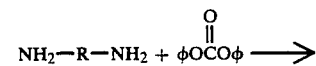

(U.S. Pat. Nos. 4,002,598; 4,115,360: and 4,178,427; N. Yamazaki and S. Nakahams, "Polymer Preprints", ACS, Div. Polym. Chem., 20:146 (1979)).

Yet another process has been described for making polymers of the same general structure by reacting polyether polyamines with phosgene in the following manner (U.S. Pat. Nos. 4,002,598; 4,115,360 and 4,178,427)

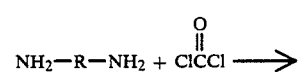

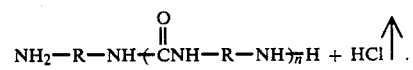

These polymers have also been used as epoxy curing agents.

Polymers related thereto have also been made by reacting amino alcohols with phosgene (C. Giori, "Polymer Preprints", ACS, Div. Polym. Chem., 11:326 (1970)).

Still another process for making materials of this type has been reported involving the reaction of polyamines with carbon dioxide in the presence of diphenyl phosphite and pyridine. This process is believed to occur according to the following chemical reaction.

$$NH_2-R-NH_2 + CO_2 + HOP(O\phi)_2 \longrightarrow$$

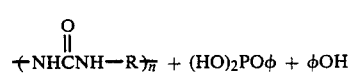

(N. Yamazaki, F. Higashi and T. Iguchi, *Tetrahedron Letters*, 1191 (1974): N. Yamazaki, F. Higashi and T. Iguchi, *Tetrahedron*, 31:3031 (1975); N. Yamazaki, F. Higashi and T. Iguchi, *J. Polym. Sci., Polym. Lett. Ed.*, 12:517 (1974); and N. Yamazaki, F. Higashi and T. Iguchi, *Polym. Ed.*, 13:785 (1975)).

Polymers have also been prepared by reacting alkylene carbonates with hexamethylenediamine. (G. Cameresi, S. Fumasoni, M. Palazzo and F. Pochetti, *Ann. Chim. (Rome)*, 57:927 (1967)). However, the work was conducted at higher temperatures. As a result, concurrent hydroxyalkylation simultaneously occurred with loss of 30 percent to 40 percent of the alkylation carbonate as carbon dioxide. Further, the work of Cameresi et al. was limited to the use of hexamethylenediamine.

In view of the deficiencies of the conventional polyurea polyamines, it would be highly desirable to provide new materials related to polyurea polyamines but having improved physical and chemical properties, said materials being produced by a simple process.

SUMMARY OF THE INVENTION

In one aspect, this invention is a novel polyahl comprising:
(1) a backbone having:
  (a) at least one acyclic urethane moiety;
  (b) at least one acyclic urea moiety; and (c) at least two residues of a polyamine which polyamine has at least two primary or secondary amine moieties or at least one primary amine moiety and at least one secondary amine moiety per molecule wherein the amine moieties are bonded to carbon atoms that are sufficiently spaced apart to preclude the formation of a cyclic urea or a cyclic urethane when reacted with an alkylene carbonate; and (2) at least two terminal groups which are primary or secondary amine, hydroxyl or a combination thereof.

In a second aspect, this invention is a novel process for preparing such novel polyahls, which process comprises:

1. reacting (a) a polyamine compound as previously defined with (b) a cyclic alkylene carbonate, in amounts thereof and under conditions effective to form (1) a compound with at least one acyclic urea moiety and at least one acyclic urethane moiety in its backbone and (2) a monoalkylene glycol corresponding to the cyclic alkylene carbonate, and
2. removing the monoalkylene glycol from said polyahl product.

In a third aspect, this invention includes isocyanate-functional prepolymers of these novel polyahls formed by reaction of these polyahls with excess polyisocyanates.

In a fourth aspect, this invention includes novel urethane/urea polymers formed by the reactions of these isocyanate-functional prepolymers with conventional polyahls and/or the novel polyahls of this invention.

In a fifth aspect, this invention includes novel urethane/urea polymers formed by the reactions of the novel polyahls of this invention with conventional polyisocyanates, optionally in the presence of other polyahls.

The introduction of acyclic urethane and urea moieties into the backbone of polyahls with hydroxyl and/or amino end groups allows adjustment of the physical and chemical properties of these polyahls to maximize their effectiveness in specific applications. For example, the polyahls of this invention are useful for producing materials for applications in flexible urethane foams, urethane coatings, rigid urethane foams, urethane/urea elastomers and plastics, adhesives, functional fluids, polymeric coatings and surfactants among others. Such polyahls are also useful in the production of polyesters and epoxy resins.

DETAILED DESCRIPTION OF THE INVENTION

The required starting materials for the novel compositions of this invention are polyamine compounds and cyclic alkylene carbonates.

Any primary or secondary polyamine can be used to make the novel compounds of this invention as long as it contains a plurality of pendant amino-functional groups which are bonded to carbons that are sufficiently spaced apart to preclude the formation of cyclic urea or cyclic urethane moieties when the polyamine is reacted with a cyclic carbonate. When the polyamine compounds are aliphatic, the amino groups are preferably spaced apart from each other by a chain of at least 4 carbon atoms. When the polyamine compounds are aromatic, the amino groups are preferably spaced apart from each other in a meta or para arrangement on the same aromatic ring or by at least 4 carbons when the amino groups are on different aromatic rings. Aliphatic diamines are a preferred class of polyamines. Examples of such materials include tetramethylenediamine, pentamethylenediamine, hexamethylenediamine, 1,12-diamino dodecane and 1,18-diamino octadecane. Aliphatic diamines can contain other moieties in their backbone such as oxygen, sulfur, nitrogen, cyclic aliphatic and aromatic. Examples of such materials include N,N'-bis(3-aminopropyl)ethylenediamine, N,N'-bis-(3-aminopropyl)piperazine, diethylenetriamine, triethylenetetramine, N,N'-bis(2-aminoethyl)piperazine and 1,8-diamino-p-menthane.

Another preferred class of polyamines are those prepared by the reductive amination of polyols. Examples of such polyamines can be found in U.S. Pat. Nos. 3,128,311; 3,152,998; 3,347,926: 3,654,370; 4,014,933 and 4,153,581. Many of these materials may additionally contain alkyleneoxy groups interspersed in their backbone.

Another preferred class of polyamines are those which contain urea moieties in their backbone. Examples of such polyamines are described in U.S. Pat. Nos. 4,002,598; 4,115,360; 4,116,938 and 4,178,427, which are hereby incorporated by reference.

Aromatic polyamines are also useful to make the novel compounds of this invention. Examples include 2,4-toluenediamine, 2,6-toluenediamine, 2,4,6-toluenetriamine, 1,4-benzenediamine and 4,4'-methylenedianiline.

A mixture of two or more polyamino compounds can be suitably used. When operating the process in this way, a product is obtained with a mixed backbone structure which may be advantageous in some cases.

The spacial arrangement between the amino groups is important in order for the desired acyclic urea moieties to be formed. It is important for the amino end groups to react intermolecularly with the cyclic alkylene carbonate. If the distance between the amino end groups is less than 4 carbon atoms for an aliphatic polyamine or if the amino end groups are in an ortho arrangement in an aromatic ring, then two amino end groups can react with the same cyclic alkylene carbonate residue to form a cyclic urea moiety that does not react further. Under these circumstances the desired products are not usually formed.

The cyclic alkylene carbonates useful to make the novel compositions of this invention are typically five-membered cyclic carbonates such as those derived from 1,2-glycols or from 1,2-epoxides and carbon dioxide. Examples of cyclic alkylene carbonates include ethylene carbonate, propylene carbonate, 1,2-butylene carbonate, 2,3-butylene carbonate and vinyl ethylene carbonate. These cyclic alkylene carbonates can be represented structurally as

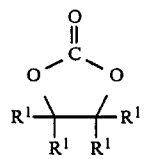

where $R^1$ is independently hydrogen, methyl, ethyl or vinyl. Cyclic carbonates which contain six-membered cyclic rings can also be used. Mixtures of cyclic alkylene carbonates can be used.

Ethylene carbonate and propylene carbonate are the most preferred cyclic alkylene carbonates to make the novel compositions of this invention.

The process of this invention is carried out by contacting polyamine compounds and cyclic alkylene carbonates under conditions suitable to form the desired product and a monoalkylene glycol by-product. This process can be carried out neat or in an inert solvent.

When an inert solvent is used, the proportion of polyamine to cyclic alkylene carbonate depends on the functionality of the polyamine. When the polyamine is a diamine, the molar ratio of cyclic alkylene carbonate to diamino compound is preferably varied between molar ratios of 2:1 and 10:1, more preferably between about 2:1 and 8:1, and still more preferably between about 2:1 and 5:1. When the functionality of the polyamine is greater than 2, these ratios can be adjusted accordingly. When an inert solvent is not used, the molar ratio of cyclic alkylene carbonate to diamino compound is preferably varied between 1:1 and 10:1, more preferably between 2:1 and 8:1, and still more preferably between 2:1 and 5:1. As the cyclic alkylene carbonate:polyamine molar ratio is increased, a larger proportion of urethane moieties is present in the backbone of the product. At the higher ratios, some carbonate moieties can also be present.

The molar ratio of urea to urethane moieties in the polymer is controlled by (1) the ratio of carbonate to amine and (2) the percent of amine conversion before removal of the azeotrope of solvent and monoalkylene glycol (when solvent is employed) or before removal of monoalkylene glycol (when solvent is not employed). For example, to produce a polymer having a urea:urethane mole ratio of about 80:20, the carbonate:amine mole ratio is 1:1 and the percent conversion of amine is about 8–10 percent. To produce a urea:urethane mole ratio of 20:80, the carbonate:amine mole ratio is about 3:1 and the percent conversion of amine is about 75 percent. At urea:urethane mole ratios less than 50:50, the level of carbonate in the polymer varies from 5 to 10 mole percent.

The mode of reactants addition is important. In a preferred mode, this process is first carried out by contacting the amino compound with the cyclic alkylene carbonate under conditions whereby reaction to form urethane moieties is maximized and where monoalkylene glycol formation is minimal. This is conveniently done neat at about 110° C. to 175° C. at about atmospheric pressure with good agitation. Further reaction to produce the desired product and the monoalkylene glycol by-product is then carried out under reduced pressure or in an inert solvent using conditions defined hereinafter.

When an inert solvent is used, it is preferred that the solvent be capable of forming an azeotropic boiling mixture with the monoalkylene glycol by-product formed. The inert solvent thus employed depends on the particular cyclic alkylene carbonate employed, since the alkylene carbonate defines the particular monoalkylene glycol by-product formed. The inert solvent must be capable of removing the by-product monoalkylene glycol from the reaction system as an azeotropic boiling mixture. Therefore, one of the primary requirements of the inert solvent is that it forms an azeotropic composition with the monoalkylene glycol. A second requirement is that the boiling point of the inert solvent be lower than the boiling point of the polyamine.

The choice of inert solvent will also depend on the desired reaction temperature and on the activity of the catalyst if a catalyst is used. The higher the boiling point of the solvent, the higher the proportion of monoalkylene glycol in the azeotropic boiling mixture, but the boiling point or reaction temperature should not be sufficiently high to initiate unwanted side reactions such as product decomposition. The higher the activity of the catalyst, the lower the boiling point of the inert solvent should be. On the other hand, the less a catalyst tends to promote side reactions, the higher the reaction temperature may be. Low boiling azeotropic-forming compounds, such as toluene or xylene, can be used to advantage with highly active catalysts.

The solvents suitable for use in this process form with monoalkylene glycols, azeotropic mixtures having boiling points preferably between about 80° C. and 250° C., more preferably between about 110° C. and 180° C. An American Chemical Society monograph has been published which lists a wide variety of azeotropic compositions ("Azeotropic Data", *Advances in Chemistry Series No. 6*, 1952). Examples are given of solvents that form azeotropic boiling mixtures with monoethylene glycol (pp. 64–68) and monopropylene glycol (p. 101). The following are examples of suitable inert solvents which may be used according to the present invention as azeotropic-forming substances for monoethylene glycol: aromatic hydrocarbons such as toluene, xylene, ethylbenzene, cumene, 1,2,4-trimethylbenzene, mesitylene, diethylbenzene, diisopropylbenzene, chlorotoluene, bromotoluene or tetralin: olefins such as propenylbenzene and allylbenzene: ethers such as dibutyl ether, diisopropyl ether, diamyl ether, anisole, phenetole or cresol methyl ether; and ketones such as dibutylketone, di-tert-butylketone or diamylketone. Cumene and xylene are preferred inert solvents.

The amount of inert solvent used can vary widely. Larger amounts of solvent represent larger quantities of solvent to be removed after reaction and higher solvent costs. However, sufficient solvent is preferably used to form a well behaved azeotrope with the monoalkylene glycol by-product and provide solvent for the reaction. Reaction temperature is controlled by quantity and type of solvent employed. The proportion of solvent to polyamine compound and cyclic alkylene carbonate can be varied between about 20:1 and 0.25:1, more preferably between about 10:1 and 1:1, and still more preferably between about 5:1 and 1:1.

When an inert solvent is used, it is preferred to employ a catalyst in the practice of this invention. The catalysts that can optionally be used in this process are the typical transesterification catalysts. Example of suitable catalysts include lithium hydride, lithium hydroxide, lithium aluminum hydride, lithium borohydride, sodium hydride, sodium metaborate, potassium metaborate, sodium methoxide, sodium hydroxide, sodium acetate, potassium acetate, potassium carbonate, zinc acetate, lead acetate, lead naphthenate, manganese acetate, mercury acetate, mercury oxide, antimony trioxide, boron trioxide, tin powder, stannous octoate, dibutyltin dilaurate, dibutyltin diacetate, dimethyltin dilaurate, titanium isopropoxide, titanium isobutoxide, tetrabutyl titanate, zirconium naphthenate, sodium stannate, potassium stannate, tetrabutyl zirconate, lanthanium hydroxide, cobalt acetylacetonate, manganese acetylacetonate and copper acetylacetonate.

The selectivity of the catalyst for the desired reaction sequence is very important. For example, when sodium stannate is used as catalyst with ethylene carbonate, up to approximately 25 percent of the ethylene glycol by-product is consumed by reaction with ethylene carbonate to form diethylene glycol. Such undesired reactions greatly upset reaction stoichiometry by consuming one of the starting materials.

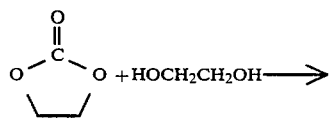

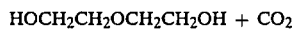

HOCH$_2$CH$_2$OCH$_2$CH$_2$OH + CO$_2$

The most preferred catalysts are dibutyltin dilaurate, dimethyltin dilaurate and dibutyltin diacetate.

The quantity of catalyst used is suitably any amount which is catalytic for the desired reaction, generally from about 0.0001 to 5 percent, by weight, based on the combined weight of the polyamine compound and cyclic alkylene carbonate used. A more preferred range is from 0.001 to 0.2 percent, while the most preferred range is from 0.005 to 0.1 percent. If the catalyst is insoluble in the reaction mixture, larger quantities of catalyst can be required.

The novel process of this invention is carried out by combining a polyamine compound and a cyclic alkylene carbonate, and, preferably, an inert solvent and a catalyst in a reaction vessel under the proper conditions of temperature, pressure and proportions of the reactants. In cases where the cyclic alkylene carbonate or the polyamino compound are relatively volatile and an inert solvent is employed, it may be desirable to attach a fractionation column onto the reactor to retain these relatively volatile components in the reactor while permitting the azeotropic boiling mixture to escape. The azeotrope is separated and the inert solvent is returned to the reactor.

The process of this invention can be conducted at any temperature at which urea and urethane moieties are formed by contacting the reactants. When an inert solvent is used, the present process is conducted at a temperature between about 80° C. and 230° C., more preferably between about 130° C. and 210° C., and most preferably between about 130° C. and 180° C. When an inert solvent is not used and the process is carried out at reduced pressures, a reaction temperature between about 120° C. and 275° C. is preferred, and still more preferred between about 150° C. and 250° C.

When an inert solvent is not employed, the process of this invention is preferably conducted at reduced pressure. Under such conditions, the fractional distillation is preferably conducted at a pressure between 1 mm Hg and 500 mm Hg; more preferred between 5 mm Hg and 200 mm Hg. It is preferred to not use a catalyst when the process of this invention is carried out in this mode. When an inert solvent is used, the process of this invention is preferably conducted at atmospheric pressure. This process can also be conducted at a pressure lower or higher than atmospheric pressure. The pressure used depends on the boiling point of the monoalkylene glycol-inert solvent azeotrope. With higher boiling azeotropes, reduced pressures are sometimes desirable, while higher pressures are sometimes desirable with lower boiling azeotropes. Reduced pressures lower the temperature to which the product is exposed during its preparation. This can be important when using certain catalysts which tend to degrade the product at higher temperatures. Suitable ranges of pressure are between about 5 mm and 10 atm. However, other suitable pressures may also be used. In a preferred embodiment the fractional distillation is conducted at a pressure between 200 mm and 2 atm. The reaction is generally allowed to proceed for polymerization between about 2 hours and 50 hours, depending on the reactants, temperatures, catalyst type and catalyst concentration, and average molecular weight of the product which is desired. More commonly, the reaction will proceed for about 2 hours to 40 hours.

When an inert solvent is not used, the reactants are preferably heated under the proper conditions of reduced pressure, whereby the monoalkylene glycol by-product is volatilized from the reactor and condensed. Alternatively, the monoalkylene glycol by-product can be removed from the reactor by other methods such as extraction or adsorption.

The course of the reaction can be followed by measuring the amount of the monoalkylene glycol removed from the reactor. When an inert solvent is employed, the monoalkylene glycol visually separates from the inert solvent in condensed azeotrope. In addition, the extent of reaction can also be followed by periodic removal of samples from the reactor, followed by measurement of decrease in the free amine content and molecular weight build.

It is surprising that a useful process could be developed due to the complexity of the reaction conditions. The reaction system contains at least four substances: at least one polyamino compound, at least one cyclic alkylene carbonate, the product and the monoalkylene glycol by-product. In a preferred embodiment, a catalyst and an inert solvent are also present. All components influence each other in a manner which is not foreseeable. When using a solvent, the azeotropic boiling mixture obtained consists essentially of only monoalkylene glycol and inert solvent. It is critical that the process conditions allow a controlled molecular weight build up while minimizing or eliminating all side reactions. The process is preferably run in such a way that the azeotropic boiling mixture is separated at a point removed from the reactor and that the inert solvent is returned to the reactor.

The removal of the solvent to obtain the polymeric product may be accomplished by distillation at either atmospheric or reduced pressures. In general, the last traces of solvent are removed at reduced pressures when higher boiling solvents are used. The temperature must be held below the product decomposition temperature during solvent removal. Higher temperatures can be used for solvent removal if a catalyst is not present since the product decomposition temperature is increased. A falling film still is particularly well suited for removal of higher boiling solvents since the contact time at high temperatures is reduced to a minimum.

The removal of the catalyst may be attained by adsorption on an inert material such as magnesium silicate, silica gel, alumina or activated carbon or the catalyst can be removed by precipitation using a solvent in which the product is soluble and the catalyst is insoluble. One particularly useful method is described in U.S. Pat. No. 4,528,364. In this procedure, part of the catalyst is precipitated using acetone as solvent while the rest of the catalyst is removed by adsorption on magnesium silicate. After filtration, the product is recovered by stripping off the solvent. The catalyst can also be removed by washing it from the product. In this case a solvent is used in which the catalyst is soluble but the product is insoluble.

Thus, the initial reaction of the process of this invention can be schematically represented as follows for a diamine:

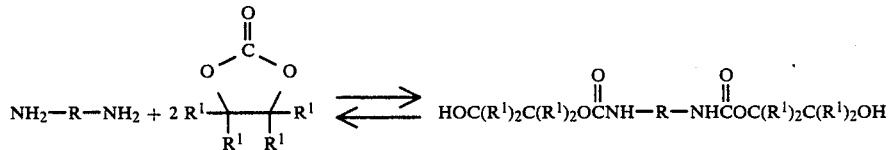

(1)

The values of $R^1$ and R are those that have been hereinbefore defined. It is important to force this equilibrium to the right to maximize the amount of urethane moieties that will be present in the backbone of the novel compositions of this invention.

Further reactions of the products of reaction (1) and other intermediates with polyamines and/or alkylene carbonates lead to the novel compositions of this invention and by-product monoalkylene glycol.

The novel polyahls of this invention preferably have sufficient urethane and urea moieties to act as H-bonding sites when used in urethane/urea polymers and thereby change the polymer properties. Since urethane and urea moieties form different types of hydrogen bonding, it is very desirable to be able to control the amount of each. Such polyahls optionally contain carbonate moieties which impart hydrogen bonding acceptor sites to the resultant urea/urethane polymers made from such polyahls.

In preferred embodiments wherein diamines are used as the polyamine, the novel polyahls can be represented by the following formula

wherein
the values of $R^1$ are those that have been hereinbefore defined;
R is separately in each occurrence an alkylene, alkyleneoxy, polyalkyleneoxy, cycloalkylene, cycloalkyleneoxy, polycycloalkyleneoxy or aralkylene moiety having at least 4 carbon atoms which are substituted with hydrogen or a substituent which is inert to the reaction of the polyamine with alkylene carbonate;
x is an integer from 1 to 20; and
E is either (1) an end group represented by the structure

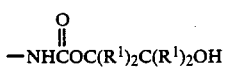

or is (2) the end group from the amino compound reactant $-NHR^2$, wherein $R^2$ is hydrogen or lower alkyl.

In instances wherein the novel polyahl contains carbonate moieties in its backbone, the polyahl when prepared from diamine is represented by the following formulae among others:

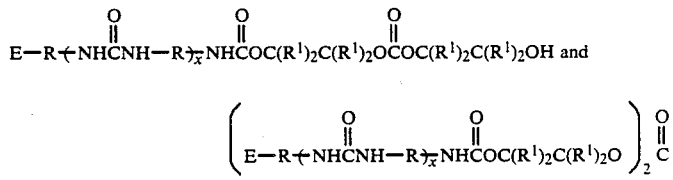

wherein E, R, $R^1$ and x are as defined hereinbefore.

The novel polyahls of this invention can be low molecular weight compounds, oligomeric materials or polymeric materials, since the molecular weight of the end products can be controlled within broad limits. Product molecular weights ($\overline{M}n$) are preferably from about 300 to 30,000, more preferably from about 300 to 20,000 and most preferably from 500 to 10,000.

In a third aspect, this invention is isocyanate-functional prepolymers of the novel hydroxyl and/or amino functional polyahls containing urea and urethane moieties of this invention formed by the reactions of these polyahls with excess polyisocyanates.

The polyisocyanates suitable for these reactions include aliphatic, cycloaliphatic, araliphatic, aromatic and heterocyclic polyisocyanates. Specific examples include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate and mixtures of these isomers: 1-isocyanato-3,3,5-trimethyl-5-isocyanato methyl cyclohexane (see e.g., German Auslegeschrift No. 1,202,785); 2,4- and 2,6-hexahydrotolylene diisocyanate and mixtures of these isomers, hexahydro-1,3- and/or 1,4-phenylene diisocyanate, perhydro-2,5'- and/or 4,4'-diphenyl methane diisocyanate, 1,3- and 1,4-phenylene diisocyanate, 2,4- and 2,6-tolylene diisocyanate and mixtures of these isomers, diphenyl methane-2,4'- and/or 4,4'-diisocyanate, naphthylene-1,5-diisocyanate, triphenyl methane-4,4',4''-triisocyanate, polyphenyl polymethylene polyisocyanates of the type obtained by condensing aniline with formaldehyde, followed by phosgenation and such as described for example in British Patent Nos. 874,430 and 848,671, perchlorinated aryl polyisocyanates of the type described in German Auslegeschrift No. 1,157,601, polyisocyanates containing carbodiimide groups of the type described in German Patent No. 1,092,007, diisocyanates of the type described in U.S. Pat. No. 3,492,330, polyisocyanates containing allophanate groups of the type described, for example, in British Patent No. 994,890 in Belgian Patent No. 761,626 and in published Dutch Patent Application No. 7,102,524, polyisocyanates containing isocyanurate groups of the type described in German Patent Nos. 1,022,789; 1,222,067 and 1,027,394 and in German Offenlegungsschrift Nos. 1,929,034 and 2,004,048, polyisocyanates containing urethane groups of the type described, for example, in Belgian Patent No. 752,261 or in U.S. Pat. No. 3,394,164, polyisocyanates containing acrylated urea groups as described in German Patent No. 1,230,778, polyisocyanates containing biuret groups of the type described, for example, in German Patent No. 1,101,392, in British Patent No. 889,050 and in French Patent No. 7,017,514, polyisocyanates obtained by telomerization reactions of the type described, for example, in Belgian Patent No. 723,640, polyisocyanates containing ester groups of the type described, for example, in British Patent Nos. 965,474 and 1,072,956, in U.S. Pat. No. 3,567,763 and in German Patent No. 1,231,688 and reaction products of the aforementioned isocyanates with acetals as described in German Patent No. 1,072,385.

It is also possible to use the distillation residues containing isocyanate groups accumulating in the commercial production of isocyanates, optionally in solution in one or more of the aforementioned polyisocyanates. In addition, it is possible to use mixtures of the aforementioned polyisocyanates.

Additional polyisocyanates suitable for use in this invention include those described by W. Siefken in *Justus Liebigs Annalen der Chemie*, 562, pp. 75–136 and in U.S. Pat. Nos. 3,284,479; 4,089,835; 4,093,569; 4,221,876; 4,310,448; 4,359,550 and 4,495,309.

One class of particularly useful polyisocyanates are the aromatic polyisocyanates such as 2,4- and 2,6-tolylene diisocyanate and mixtures of these isomers ("TDI"), polyphenyl-polymethylene polyisocyanates of the type obtained by condensing aniline with formaldehyde, followed by phosgenation ("crude MDI") and, polyisocyanates containing carbodiimide groups, urethane groups, allophanate groups, isocyanurate groups, urea groups or biuret groups ("modified polyisocyanates").

A preferred class of aromatic polyisocyanates is methylene bis(4-phenylisocyanate) or MDI. Pure MDI, quasi- and prepolymers of MDI, modified pure MDI, etc. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine modified pure MDI is included also. This product is made by heating pure distilled MDI in the presence of a catalyst.

The isocyanate-functional prepolymers of this invention can be made by addition of excess polyisocyanates to the novel polyahls of this invention or by addition of the novel polyahls of this invention to excess polyisocyanates. The preparation of isocyanate-functional prepolymers by reaction of conventional polyisocyanates with conventional polyols is well-known in the art. Examples can be found in U.S. Pat. Nos. 4,108,842; 4,125,522 and 4,476,293, the relevant portions of which are hereby incorporated by way of reference in their entirety.

In a fourth aspect, this invention includes novel urethane/urea polymers formed by the reactions of the isocyanate-functional prepolymers defined above with polyahls as such polyahls are described in U.S. Pat. No. 4,460,715, the relevant portions of which are hereby incorporated by reference. Many of these polyahls are commonly called chain-extenders when used with isocyanate-functional prepolymers. Optionally, catalysts and a variety of additives can be included.

The chain-extenders useful to make such urethane/urea polymers of this invention are preferably difunctional. Mixtures of difunctional and trifunctional chain-extenders are also useful in this invention. The chain-extenders useful in this invention include diols, amino alcohols, diamines or mixtures thereof. Low molecular weight linear diols such as 1,4-butanediol and ethylene glycol have been found suitable for use in this invention. Other chain-extenders including cyclic diols such as 1,4-cyclohexanediol and 1,4-cyclohexanedimethanol; aromatic ring-containing diols such as bishydroxyethylhydroquinone; amide- or ester-containing diols or amino alcohols are useful. Aromatic diamines and aliphatic diamines are suitable chain-extenders. Examples include ethylenediamines, 1-(2-aminoisopropyl-4-methyl-4-aminocyclohexane), 1,2-propanediamine, 1,4-butanediamine, 1,6-hexanediamine, diethyltoluenediamine and 1,4-bis(aminomethyl)cyclohexane. Additional examples of useful chain-extenders can be found in U.S. Pat. Nos. 4,297,444; 4,202,957; 4,476,292; 4,495,309 and 4,218,543.

Catalysts such as tertiary amines or an organic tin compound or other polyurethane catalysts may be used. The organic tin compound may suitably be stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 18 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used. Other catalysts include organo zinc, mercury and lead compounds.

Tertiary amine catalysts include trialkylamines (e.g., trimethylamine, triethylamine), heterocyclic amines, such as N-alkylmorpholines (e.g., N-methylmorpholine, N-ethylmorpholine, dimethyldiaminodiethyl ether, etc.), 1,4-dimethylpiperazine, triethylenediamine, etc., and aliphatic polyamines, such as N,N,N',N'-tetramethyl-1,3-butanediamine.

Optional additives include anti-foaming agents such as glycerine, an ethyl acrylate-2-ethylhexyl acrylate copolymer, dimethyl siloxane copolymers and silicones; antioxidants such as esters of β-(3,5-di-tert-butyl-4-hydroxyphenyl) propionic acid with monohydric or polyhydric alcohols, for example, methanol, octadecanol, 1,6-hexanediol, neopentyl glycol, thiodiethylene glycol, diethylene glycol, triethylene glycol, pentaerythritol, tris-hydroxyethyl isocyanurate, and dihydroxyethyl oxalic acid diamide; UV absorbers and light stabilizers such as 2-(2'-hydroxyphenyl)benzotriazoles and sterically hindered amines such as bis-(2,2,6,6-tetramethylpiperidyl)-sebacate, bis-(1,2,2,6,6-pentamethylpiperidyl)-sebacate, n-butyl-3,5-di-tert-butyl-4-hydroxybenzyl malonic acid bis-(2,2,6,6-pentamethylpiperidyl) ester, condensation product of 1-hydroxyethyl-2,2,6,6-tetramethyl-4-hydroxypiperidine and succinic acid, condensation product of N,N'-(2,2,6,6-tetramethylpiperidyl)-hexamethylene diamine and 4-tert-octylamino-2,6-dichloro-1,3,5-s-triazine, tris-(2,2,6,6-tetramethylpiperidyl)-nitrilotriacetate, tetrakis-(2,2,6,6-tetramethyl-4-piperidyl)-1,2,3,4-butane-tetracarbonic acid and 1,1'-(1,2-ethanediyl)-bis-(3,3,5,5-tetramethylpiperazinone): plasticizers such as phthalates, adipates, glutarates, epoxidized vegetable oils, and the like; fungicides; pigments: dyes: reactive dyes: moisture scavengers; and the like. In addition, fillers and reinforcing materials such as chopped or milled glass fibers, chopped or milled carbon fibers and/or other mineral fibers are useful.

Approximately stoichiometric amounts of the isocyanate moieties of the isocyanate-functional prepolymers of this invention and the active hydrogen moieties on the polyahls are used. The equivalent ratio of isocyanate moieties to total active hydrogen moieties is between about 0.95:1.00 to 1.00:1.05; more preferred is an isocyanate:polyahl equivalent ratio of from 0.97:1.00 to 1.00:1.03; most preferred is a ratio of 1.00:1.00 to 1.00:1.03.

In a fifth aspect, this invention includes novel, urethane/urea polymers formed by the reactions of the novel polyahls of this invention which contain urethane and urea moieties in their backbone with polyisocyanates, optionally in the presence of other polyahls. Optionally, catalysts and a variety of additives can be included. Useful polyisocyanates, catalysts and additives are those that have been defined hereinabove.

Approximately stoichiometric amounts of the isocyanate moieties on the polyisocyanates and the total active hydrogen moieties of the polyahls of this invention which contain urethane and urea moieties in their backbone, are used. The equivalent ratio of isocyanate moieties to total active hydrogen moieties is between about 0.95:1.00 to 1.00:1.05: more preferred is an isocyanate:active hydrogen equivalent ratio of from 0.97:1.00 to 1.00:1.03; most preferred is a ratio of 1.00:1.00 to 1.00:1.03. The preparation of urethane/urea polymers is well-known in the art. Examples of typical reaction conditions employed can be found in U.S. Pat. Nos. 4,460,715 and 4,394,491, the relevant portions of which are hereby incorporated by way of reference in their entirety.

The urethane/urea polymers of the present invention can be fabricated by any fabrication technique known in the art. Useful processes include hand casting (see, for example, U.S. Pat. No. 4,476,292) and reaction injection molding (see, for example U.S. Pat. Nos. 4,297,444 and 4,495,309).

Specific Embodiments

The following examples are included for illustrative purposes only, and do not limit the scope of the invention or the claims. Unless otherwise stated, all parts and percentages are by weight.

The molecular weights and distribution are determined by size exclusion chromatography on Waters Ultrastyragel ® 1000 Å and 10,000 Å columns in series using tetrahydrofuran (THF) as the mobile phase and calibrated with narrow molecular weight poly(ethylene glycol) standards.

The Brookfield viscosities are all measured at ambient temperature using an LV4 spindle at the appropriate spin rate.

Distillate samples are analyzed by capillary gas chromatography on a Hewlett-Packard 5840A unit equipped with a J&W Scientific Company DB-1 fused silica capillary column using flame ionization detection.

COMPARATIVE EXAMPLE 1

Reaction of Propylene Carbonate with Jeffamine D-400 at Reduced Pressures; PC:D-400 Molar Ratio=1.00 (Not an example of this invention)

Propylene carbonate (71.46 g, 0.700 mole), Jeffamine D-400 (aminated poly(propylene glycol) of molecular weight 400, manufactured by the Jefferson Chemical Division of Texaco) (305.20 g, 0.700 mole) and boiling stones (0.2 g) are combined in a 500-ml, 3-necked boiling flask equipped with a thermometer, temperature controller and a down draft water-chilled condenser attached to a vacuum source through a dry ice-isopropanol trap (about −78° C.). The contents of the flask are heated to 110° C.: titration of a small sample from the flask indicates that 91.8 percent of the amine is not yet reacted. The contents of the flask are further heated to a pot temperature of 225° C. over a period of 2.2 hours at a 10 mm Hg vacuum. The distillate collected in the water-chilled condenser accounts for 32.9 weight percent (123.3 g) of the sample charged and has the following assay: 24.6 percent propylene glycol and 34.5 percent propylene carbonate. In addition, titration of the distillate indicates that it contains 12.4 percent of the D-400 charged. There is no distillate in the dry ice-isopropanol trap. The residue is a colorless liquid representing 67.0 weight percent (251.0 g) of the sample charged, has a Brookfield viscosity of 1700 cps at 25° C. and a basicity of 1.403 meq amine/g. The molecular weight by size exclusion chromatography is: Peak=1013; $\overline{M}n=661$: $\overline{M}w=1066$: PDI=1.61. The molecular weight by end group titration is 1426. The SEC molecular weight is low since this method is calibrated against poly(ethylene glycol) standards which have a different hydrodynamic volume than the product of this reaction. $^{13}$C-NMR shows that the product contains urea (157.9 ppm) moieties in its backbone and amino end groups (no hydroxyl end groups or urethane moieties in the backbone are detected).

This comparative example shows that preparation of a material that contains only amino end groups and urea moieties in its backbone.

EXAMPLE 1

Reaction of Propylene Carbonate with Jeffamine D-400; PC:D-400 Molar Ratio=1.00. High Amine Conversion Prior to Reduced Pressure Conditions Propylene carbonate (71.46 g, 0.700 mole) is placed in a 500-ml, 3-necked flask equipped with thermometer, overhead stirrer, dropping funnel, condenser, temperature controller and maintained under a nitrogen atmosphere. Jeffamine D-400 (305.20 g, 0.700 mole) is placed in the dropping funnel. The flask is heated to 110° C. and the Jeffamine D-400 is added dropwise over a period of 6 hours. Titration of a small sample from the flask indicates that 57.9 percent of the amine is not yet reacted. $^{13}$C-NMR shows the backbone contains urethane (156.2 and 156.4 ppm) moieties but no urea moieties. Two different urethane moieties are present:

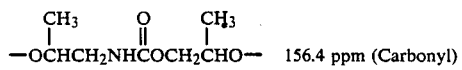   156.4 ppm (Carbonyl)

and

-continued

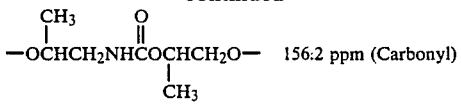
156:2 ppm (Carbonyl)

A portion of the product formed above (361.0 g) and boiling stones (0.2 g) are combined in the same equipment used in Comparative Example 1. The contents of the flask are heated to 225° C. over a period of 3 hours at a 10 mm Hg vacuum. The distillate collected in the water-chilled condenser accounts for 17.6 weight percent (63.6 g) of the sample charged and has the following assay: 64.2 percent propylene glycol and 5.5 percent propylene carbonate. In addition, titration of the distillate indicates that it contains 11.8 percent of the D-400 charged. The distillate in the dry ice-isopropanol trap accounts for 0.2 weight percent (0.8 g) of the sample charged. The residue is a straw-colored liquid representing 82.0 weight percent (295.9 g) of the sample charged, has a Brookfield viscosity of 107,000 cps at 24° C. and a basicity of 0.607 meq amine/g. The molecular weight by size exclusion chromatography is: Peak 3414; $\overline{M}n=1546$; $\overline{M}w=3322$: PDI=2.15. The molecular weight by end group analysis is 3294. $^{13}$C-NMR shows that the product backbone contains mostly urea (158.0 ppm) moieties with a smaller amount of urethane (156.4 and 156.2 ppm) moieties; the end groups are mostly amino.

This example shows that by modifying the reaction conditions of the process, different products can be made even though the same stoichiometry of reactants is used. This example produces a higher molecular weight product than Comparative Example 1 and a product that contains both urea and urethane moieties in its backbone.

EXAMPLE 2

Reaction of Propylene Carbonate with Jeffamine D-400; PC:D-400 Molar Ratio=2.10. High Amine Conversion Prior to Reduced Pressure Conditions Propylene carbonate (150.1 g, 1.470 mole) Jeffamine D-400 (305.2 g, 0.700 mole) and boiling stones (0.2 g) are combined in the same equipment used in Comparative Example 1. The contents of the flask are heated to 148° C. for 1.5 hours: titration of a small sample from the flask indicates that 40.6 percent of the amine is not yet reacted. The contents of the flask are further heated to a pot temperature of 225° C. over a period of 2.5 hours at a 10 mm Hg vacuum. The distillate collected in the water-chilled condenser accounts for 17.5 weight percent (79.6 g) of the sample charged and has the following assay: 53.2 percent propylene glycol and 44.8 percent propylene carbonate. In addition, titration of the distillate indicates that it contains 1.2 percent of the D-400 charged. There is no distillate in the dry ice-isopropanol trap. The residue is a light yellow liquid representing 81.2 weight percent (368.2 g) of the sample charged, has a Brookfield viscosity of 83,800 cps at 25° C. and a basicity of 0.249 meq amine/g. The molecular weight by size exclusion chromatography is: Peak=2371: $\overline{M}n=1365$: $\overline{M}w=2487$: PDI=1.82. $^{13}$C-NMR shows that the product contains nearly equal quantities of urea (158.0 ppm) moieties and urethane (156.2 and 156.4 ppm) moieties in addition to a much smaller quantity of carbonate (155.9 and 155.6 ppm) moieties. Both amino and hydroxyl end groups are present.

This example shows that by changing the reactants stoichiometry while using the process of this invention, a product is produced which has both amino and hydroxyl end groups and both urea and urethane moieties in its backbone.

EXAMPLE 3

Reaction of Propylene Carbonate with Jeffamine D-400: PC:D-400 Molar Ratio=3.00. High Amine Conversion Prior to Reduced Pressure Conditions Propylene carbonate (214.4 g, 2.100 moles), Jeffamine D-400 (305.2 g, 0.700 mole) and boiling stones (0.2 g) are combined in the same equipment used in Comparative Example 1. The contents of the flask are heated to 130° C. for 1.5 hours; titration of a small sample from the flask indicates that 26.2 percent of the amine is not yet reacted. The contents of the flask are further heated to a pot temperature of 225° C. over a period of 3 hours at 10 mm Hg vacuum. The distillate collected in the water-chilled condenser accounts for 21.8 weight percent (113.4 g) of the sample charged and has the following assay: 24.0 percent propylene glycol and 75.0 percent propylene carbonate. In addition, titration of the distillate indicates that it contains 0.68 percent of the D-400 charged. There is no distillate in the dry ice-isopropanol trap. The residue is a light-yellow liquid representing 76.5 weight percent (397.1 g) of the sample charged, has a Brookfield viscosity of 31,350 cps at 25° C. and a basicity of 0.310 meq amine/g. The molecular weight by size exclusion chromatography is: Peak=685; $\overline{M}n=894$; $\overline{M}w=1423$: PDI=1.59. $^{13}$C-NMR shows that the backbone contains mostly urethane (156.4 and 156.2 ppm) moieties with smaller amounts of urea (158.0 ppm) moieties. Both amino and hydroxyl end groups are present.

This example shows that further changes in the product composition can be obtained by changing the reactants stoichiometry while using the process of this invention.

EXAMPLE 4

Reaction of Propylene Carbonate with Jeffamine D-400 in Cumene; PC:D-400 Molar Ratio=3.00.

A 500-ml, 3-necked boiling flask is equipped with a short packed column (20 mm×175 mm) and a mechanical stirrer. A water-cooled condenser and receiver are located above the column. Thermometers are used to measure the temperature in the reactor and the head space temperature above the packed column. The flask is charged with propylene carbonate (107.2 g, 1.05 moles), Jeffamine D-400 (152.6 g, 0.350 mole), dibutyltin dilaurate (0.26 g, 0.1 weight percent based on reactants) and cumene (150 ml). The content of the flask is heated at gentle reflux and the monopropylene glycol (MPG) formed is recovered in the receiver from the MPG-cumene azeotropically distilling mixture. The results are given in Table I hereinbelow.

TABLE I

| MPG Removed as the MPG-Cumene Azeotrope vs. Reaction Time | | | |
|---|---|---|---|
| Time at Reflux (hours) | Pot Temp. (°C.) | Head Temp. (°C.) | MPG Formed (ml) |
| 0 | 167 | 145 | 0 |
| 0.50 | 164 | 145 | 1.2 |

TABLE I-continued

| Time at Reflux (hours) | MPG Removed as the MPG-Cumene Azeotrope vs. Reaction Time | | MPG Formed (ml) |
|---|---|---|---|
| | Pot Temp. (°C.) | Head Temp. (°C.) | |
| 1.58 | 162 | 145 | 3.8 |
| 2.58 | 162 | 145 | 6.6 |
| 3.07 | 162 | 145 | 7.8 |
| 5.08 | 162 | 145 | 11.8 |
| 20.50 | 163 | 148 | 25.4 |

The distillate contains 81.2 percent monopropylene glycol, 1.9 percent propylene carbonate and 16.9 percent cumene as determined by capillary gas chromatography. The bulk of the cumene (135 ml) is removed from the product by rapidly raising the temperature to 190° C. The crude product (20 weight percent in acetone) is stirred with magnesium silicate (one gram/10 g of product) for 3 hours to adsorb the catalyst, followed by filtration to remove the catalyst/magnesium silicate and concentration to remove the acetone. The remainder of the cumene is removed by heating to 155° C. at 10 mm Hg vacuum.

The product is a straw-colored, viscous liquid with the following properties: basicity, 0.130 meq amine/g; molecular weight by size exclusion chromatography, $\overline{Mn}=1973$, $\overline{Mw}=4698$, PDI=2.48; Brookfield viscosity, 459,000 cps at 23° C. $^{13}$C-NMR shows that the product contains major quantities of both urethane (156.4 ppm and 156.2 ppm) moieties and urea (158.0 ppm) moieties as well as much smaller quantities of carbonate (155.9 ppm) moieties in its backbone.

This example shows that the compositions of this invention can be made by carrying out the reaction under azeotropic distillation conditions.

EXAMPLE 5

Reaction of Propylene Carbonate with Jeffamine D-400 in Cumene; PC:D-400 Molar Ratio=2.10.

Propylene carbonate (75.05 g, 0.735 mole), Jeffamine D-400 (152.6 g, 0.375 mole), dibutyltin dilaurate (0.23 g, 0.1 weight percent based on reactants) and cumene (150 ml) are combined into the same reaction setup as used in Example 4. The content of the flask is heated at gentle reflux and the monopropylene glycol formed is recovered in the receiver from the MPG-cumene azeotropically distilling mixture. The results are given in Table 11 hereinbelow.

TABLE II

| Time at Reflux (hours) | MPG Removed as the MPG-Cumene Azeotrope vs. Reaction Time (Example 5) | | MPG Formed (ml) |
|---|---|---|---|
| | Pot Temp. (°C.) | Head Temp. (°C.) | |
| 0 | 165 | 145 | 0 |
| 0.45 | 165 | 145 | 0.4 |
| 1.45 | 161 | 145 | 2.6 |
| 19.00 | 161 | 149 | 23.8 |

The distillate contains 80.4 percent monopropylene glycol, 0.7 percent propylene carbonate and 18.9 percent cumene as determined by capillary gas chromatography. The bulk of the cumene (135 ml) is removed from the product by rapidly raising the temperature to 190° C. The catalyst is removed by the same procedure used in Example 4. The residual cumene is removed by heating to 150° C. at 10 mm Hg vacuum.

The product is a straw-colored, viscous liquid with the following properties: basicity, 0.111 meq amine/g; molecular weight by size exclusion chromatography, $\overline{Mn}=2337$, $\overline{Mw}=6578$, PDI=2.81; Brookfield viscosity, 572,000 cps at 24° C. $^{13}$C-NMR shows that the product backbone contains mostly urea (158.0 ppm) moieties and a smaller amount of urethane (156.4 ppm and 156.2 ppm) moieties.

It is understood that various other modifications will be apparent to, and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A liquid polymer comprising
   (1) a backbone having:
      (a) at least one acyclic urethane moiety;
      (b) at least one acyclic urea moiety; and
      (c) at least two polyalkyleneoxy moieties; and
   (2) at least two terminal groups which are primary or secondary amine, hydroxyl or a combination thereof,
   wherein each urea of urethane moiety is separated from each urea or urethane moiety by a polyalkyleneoxy moiety.

2. The liquid polymer of claim 1 wherein the polyalkyleneoxy polyamine is a diamine with a molecular weight of from about 200 to about 6000.

3. A liquid polymer represented by the following formula

wherein
R is separately in each occurrence a polyalkyleneoxy moiety;
$R^1$ is separately in each occurrence hydrogen, methyl, ethyl or vinyl;
x is an integer from 1 to 20; and
E is either (1) an end group represented by the structure

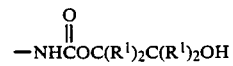

or is (2) —NHR$^2$, wherein R$^2$ is hydrogen or lower alkyl.

4. The liquid polymer of claim 3 wherein the polyalkyleneoxy polyamine is a diamine with a molecular weight of from about 200 to about 6000 and x is an integer of from 1 to 10.

5. The liquid polymer of claim 4 wherein R$^1$ is hydrogen or methyl.

6. The liquid polymer of claim 3 wherein E is —NHR$^2$, wherein R$^2$ is hydrogen or lower alkyl.

7. THe liquid polymer of claim 6 wherein R$^2$ is hydrogen.

* * * * *